United States Patent
Shindou (10) Patent No.: US 10,474,131 B2
(45) Date of Patent: Nov. 12, 2019

(54) NUMERICAL CONTROLLER HAVING FUNCTION OF AUTOMATICALLY SELECTING PARAMETER BASED ON SIZE OF MACHINING AREA

(71) Applicant: FANUC CORPORATION, Minamitsuru-gun, Yamanashi (JP)

(72) Inventor: Masaaki Shindou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 168 days.

(21) Appl. No.: 15/284,694

(22) Filed: Oct. 4, 2016

(65) Prior Publication Data

US 2017/0097629 A1    Apr. 6, 2017

(30) Foreign Application Priority Data

Oct. 5, 2015 (JP) ................................. 2015-197934

(51) Int. Cl.
*G05B 19/408* (2006.01)
*G05B 19/4093* (2006.01)
*G05B 19/406* (2006.01)

(52) U.S. Cl.
CPC ....... *G05B 19/4083* (2013.01); *G05B 19/406* (2013.01); *G05B 19/40937* (2013.01);
(Continued)

(58) Field of Classification Search
CPC .......... G05B 19/4083; G05B 19/40937; G05B 19/406; G05B 2219/36307;
(Continued)

(56) References Cited

U.S. PATENT DOCUMENTS 5,247,453 A * 9/1993 Mimura ........... G05B 19/40932
700/183
5,552,688 A    9/1996 Haga
(Continued)

FOREIGN PATENT DOCUMENTS

CN    1371489 A    9/2002
CN    101375220 A    2/2009
(Continued)

OTHER PUBLICATIONS

Japanese Office Action with English language translation for Application No. 2015-197934, dated Feb. 7, 2017, 6 pages.
(Continued)

*Primary Examiner* — Thomas C Lee
*Assistant Examiner* — Hawa Z Dirie
(74) *Attorney, Agent, or Firm* — RatnerPrestia (57) ABSTRACT

A numerical controller includes a data table on which data in which a size of a machining area and a setting value of a parameter, which is influenced by a size of a machining area, are associated with each other is registered. Further, the numerical controller estimates a size of a machining area based on a setting value of a parameter used for control of a machine tool. In the case where data corresponding to the estimated size of the machining area is registered on the data table, the numerical controller acquires a parameter setting value corresponding to the size of the machining area from the data table so as to set the parameter setting value.

8 Claims, 6 Drawing Sheets

(52) U.S. Cl.
CPC .............. *G05B 2219/35398* (2013.01); *G05B 2219/36307* (2013.01); *G05B 2219/49148* (2013.01); *Y02P 90/265* (2015.11)

(58) Field of Classification Search
CPC  G05B 2219/35398; G05B 2219/49148; Y02P 90/265
USPC ......................................................... 700/170
See application file for complete search history.

(56) References Cited

U.S. PATENT DOCUMENTS

| | | | |
|---|---|---|---|
| 6,291,959 | B1 | 9/2001 | Yoshida et al. |
| 6,587,744 | B1 | 7/2003 | Stoddard et al. |
| 2002/0084763 | A1* | 7/2002 | Shibukawa ...... G05B 19/40937 318/569 |
| 2002/0193906 | A1* | 12/2002 | Sugiyama .............. B23Q 15/00 700/188 |
| 2005/0283269 | A1* | 12/2005 | Genma .............. G05B 19/4068 700/177 |
| 2009/0018690 | A1 | 1/2009 | Negre |
| 2010/0114359 | A1* | 5/2010 | Kommareddy .... G05B 19/4093 700/173 |
| 2013/0066447 | A1 | 3/2013 | Baierl-Moehler et al. |
| 2016/0091393 | A1* | 3/2016 | Liao ................... B23Q 17/0995 702/34 |

FOREIGN PATENT DOCUMENTS

| | | |
|---|---|---|
| CN | 101846993 A | 9/2010 |
| CN | 102789208 A | 11/2012 |
| JP | H 06-142954 A | 5/1994 |
| JP | H 10-80055 A | 3/1998 |
| JP | 2000-271836 A | 10/2000 |
| JP | 2002172543 A | 6/2002 |
| JP | 2009043005 A | 2/2009 |
| JP | 2013-525984 A | 6/2013 |

OTHER PUBLICATIONS

Chinese Office Action for Chinese Application No. 2016108757095, dated May 9, 2018, with English translation, 17 pages.

* cited by examiner

NUMERICAL CONTROLLER HAVING FUNCTION OF AUTOMATICALLY SELECTING PARAMETER BASED ON SIZE OF MACHINING AREA

BACKGROUND OF THE INVENTION

1. Field of the Invention

The present invention relates to a numerical controller which has a function of automatically selecting a parameter based on a size of a machining area.

2. Description of the Related Art

Various prior art techniques for automatically setting and adjusting a parameter of a numerical controller, which controls a machine tool, so as to set a parameter suitable for the machine tool are well known.

For example, Japanese Patent Application Laid-Open No. 10-080055 (JP 10-080055, A) discloses a technique in which a motor temperature after set time is estimated based on a measured motor temperature and when the estimated motor temperature exceeds a threshold value, at least one of lowering the maximum speed of the motor, increasing an acceleration/deceleration time constant, reducing an override value, and increasing operation stop time is performed so as to prevent overheat of the motor.

Further, Japanese Patent Application Laid-Open No. 2000-271836 (JP 2000-271836, A) discloses a technique in which acceleration/deceleration time constants in rapid traverse and cutting feed of a feed axis and data on a tolerable predetermined amount of heat generation are preliminarily set and the acceleration/deceleration time constants are adjusted in the case where an amount of heat generation calculated based on data in an operation based on a numerical control program exceeds the tolerable predetermined amount of heat generation.

Furthermore, Japanese Unexamined Patent Application Publication (Translation of PCT Application) No. 2013-525894 (JP 2013-525894, A) discloses a technique in which control is performed by using a data set in which respective tools, tool paths, and machining parameters are stored for all of various manufacturable products. Furthermore, Japanese Patent Application Laid-Open No. 06-142954 (JP 06-142954, A) discloses a technique in which machining data, in which a machining condition corresponding to each machining shape of a member to be machined is recorded, is prepared and machining is performed based on the machining data corresponding to a machining shape.

However, in both of the techniques disclosed in JP 10-080055, A and JP 2000-271836, A, a parameter is adjusted based on information obtained when a control axis operates (a motor temperature or an amount of heat generation) and thus, these techniques are based on the premise that a machine tool is already operable. Therefore, these techniques are not applicable to automatic adjustment of a parameter in starting-up of a machine tool.

Further, in the techniques disclosed in JP 2013-525894, A and JP 06-142954, A, a parameter is switched based on a numerical control program prepared for each product and thus, these techniques are based on the premise that a machine tool is already operable. Therefore, these techniques are not applicable to automatic adjustment of a parameter in starting-up of a machine tool.

SUMMARY OF THE INVENTION

An object of the present invention is to provide a numerical controller which is capable of automatically setting a parameter suitable for a machine tool even when the machine tool is not operable.

A numerical controller, according to the present invention, which controls a machine performing machining of a workpiece in a machining area, includes a parameter setting storage unit in which a setting value of a parameter used for control of the machine is set, a machining area estimation unit that estimates a size of the machining area based on the setting value of the parameter, which is set in the parameter setting storage unit, a data table on which data in which a size of the machining area and at least one setting value of the parameter, which is influenced by a size of the machining area, are associated with each other is registered, a machining area determination unit that determines whether data corresponding to a size of the machining area, which is estimated by the machining area estimation unit, is registered on the data table, and a parameter setting value automatic selection unit that acquires a setting value of the parameter corresponding to a size of the machining area from the data table so as to set the setting value of the parameter, which is acquired, in the parameter setting storage unit in a case where the machining area determination unit determines that data corresponding to a size of the machining area is registered on the data table.

The numerical controller may further include a stroke limit setting determination unit that determines whether or not a setting value of a stroke limit of at least one axis included in the machine is set in the parameter setting storage unit, and in the case where the stroke limit setting determination unit determines that a setting value of a stroke limit of the axis is set in the parameter setting storage unit, the machining area estimation unit may estimate a size of the machining area based on the setting value of the stroke limit of the axis.

The numerical controller may further include a spindle attachment determination unit that determines whether or not a setting value of a motor number of a spindle motor included in the machine is set in the parameter setting storage unit, and in the case where the spindle attachment determination unit determines that a setting value of a motor number of the spindle motor is set in the parameter setting storage unit, the machining area estimation unit may estimate a size of the machining area based on the setting value of the motor number of the spindle motor.

The numerical controller may further include a spindle motor-number machining-area correspondence table in which a motor number of the spindle motor and a size of the machining area are associated with each other, and the machining area estimation unit may estimate a size of the machining area by referring to the spindle motor-number machining-area correspondence table based on a setting value of a motor number of the spindle motor.

The numerical controller may further include a feed axis attachment determination unit that determines whether or not a setting value of a motor number of at least one feed axis motor included in the machine is set in the parameter setting storage unit, and in the case where the feed axis attachment determination unit determines that a setting value of a motor number of the feed axis motor is set in the parameter setting storage unit, the machining area estimation unit may estimate a size of the machining area based on the setting value of the motor number of the feed axis motor.

The numerical controller may further include a feed axis motor-number machining-area correspondence table in which a motor number of the at least one feed axis motor and a size of the machining area are associated with each other, and the machining area estimation unit may estimate a size of the machining area by referring to the feed axis motor-number machining-area correspondence table based on a setting value of a motor number of the feed axis motor.

According to the present invention, a parameter which takes time to be set can be easily set based on a size of a machining area. Therefore, a parameter suitable for a machining tool can be automatically set even when the machine tool is in an inoperable state.

BRIEF DESCRIPTION OF THE DRAWINGS

The above-described and other objects and features of the present invention will be apparent from the following embodiments which are described in reference to the accompanying drawings. Among these drawings.

DETAILED DESCRIPTION OF THE PREFERRED EMBODIMENT

A numerical controller according to a first embodiment of the present invention is first described with reference to FIGS. 1 to 3.

Figure 1:
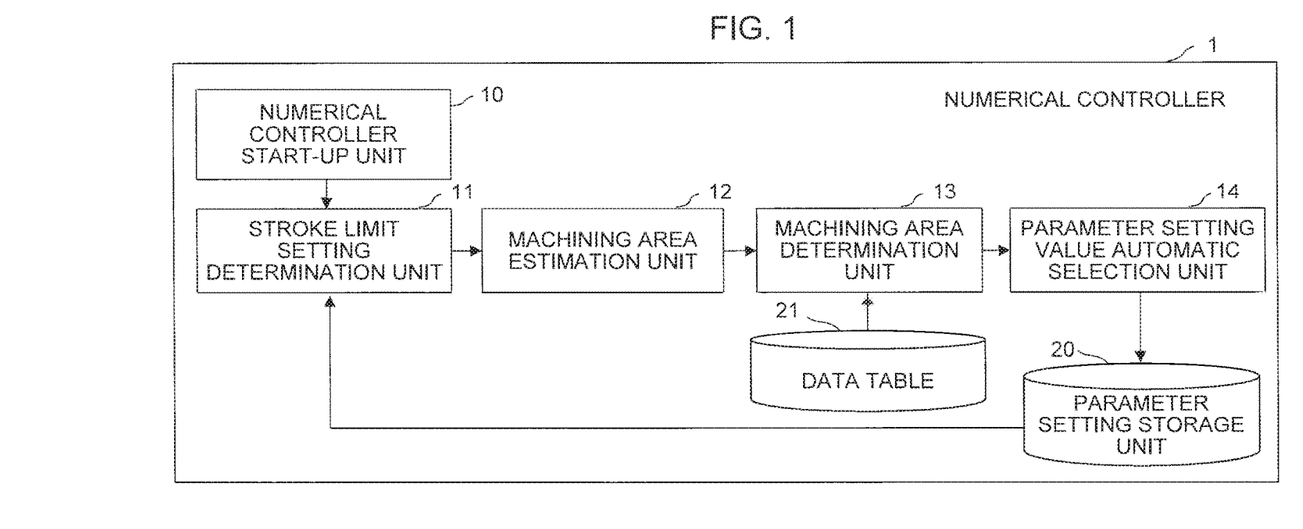
FIG. 1 is a functional block diagram illustrating a numerical controller according to a first embodiment of the present invention.

FIG. 1 is a functional block diagram illustrating a numerical controller according to the first embodiment of the present invention.

A numerical controller 1 includes a numerical controller start-up unit 10, a stroke limit setting determination unit 11, a machining area estimation unit 12, a machining area determination unit 13, and a parameter setting value automatic selection unit 14. The numerical controller 1 includes general functional means such as an instruction analysis unit, an interpolation unit, and a servo control unit which are required for performing numerical control of a machine tool, other than the above-mentioned functional means. However, description of these general functional means will be omitted in this specification.

The numerical controller start-up unit 10 performs start-up processing of the numerical controller 1. In the start-up processing, the numerical controller start-up unit 10 performs check of a memory, various controllers, an interface, and the like, which are not shown, expansion of a system program on a memory, execution of an initialization program, and the like.

The stroke limit setting determination unit 11 is a functional means which operates after completion of the start-up processing performed by the numerical controller start-up unit 10. The stroke limit setting determination unit 11 confirms a setting value of a stroke limit of each axis provided to a machine tool which is a control object. The setting value is set in a parameter setting storage unit 20 which is provided on a memory (not shown) of the numerical controller 1. Then, in the case where a stroke limit of each axis is set, the stroke limit setting determination unit 11 instructs the machining area estimation unit 12 to continue processing for automatically selecting a parameter setting value.

The machining area estimation unit 12 estimates a size of a machining area based on a setting value, which is read from the parameter setting storage unit 20, of a stroke limit of each axis. In the case where a machine tool which is a control object is provided with three basic axes, for example, the machining area estimation unit 12 calculates a volume by multiplying stroke limits of these three basic axes and sets the volume as the size of the machining area. Here, in the case where one axis or two axes among the three basic axes does/do not exist, an area obtained by multiplying stroke limits of two axes or the length of a stroke limit of one axis (instead of a volume) may be set as the size of the machining area.

The machining area determination unit 13 refers to a data table 21 based on a size of a machining area estimated by the machining area estimation unit 12 so as to determine whether or not data corresponding to the estimated size of the machining area is registered on the data table 21. In the case where data corresponding to the estimated size of the machining area is registered on the data table 21, the machining area determination unit 13 instructs the parameter setting value automatic selection unit 14 to automatically select a parameter setting value.

Figure 2:
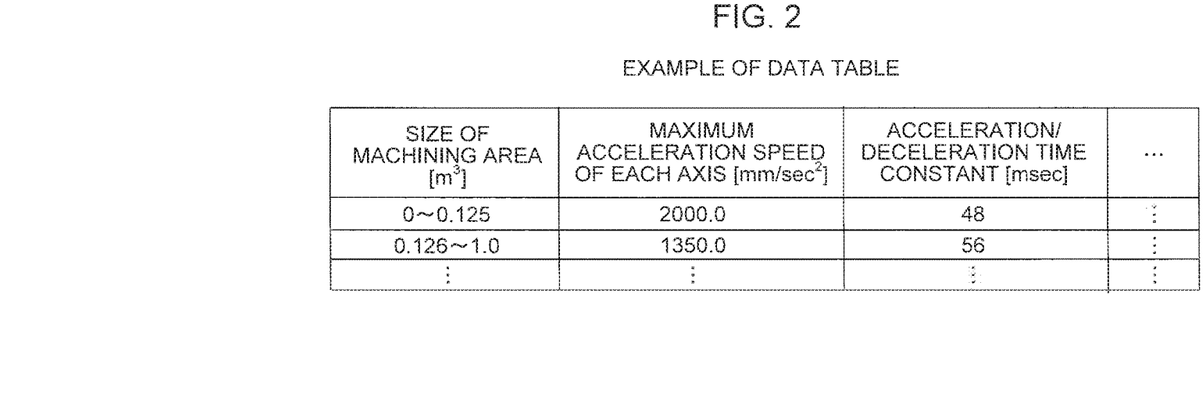
FIG. 2 illustrates a data table included in the numerical controller of FIG. 1.

In the above-mentioned data table 21, setting values of parameters (the maximum acceleration speed of each axis, for example), which correspond to a size of a machining area, are influenced by a size of a machining area, and are related to control of the numerical controller 1, are stored as illustrated in FIG. 2. Setting values of such parameters are stored in the data table 21 by a maker of the numerical controller 1, but such configuration may also be employed that an operator or the like can change setting values of parameters with an input means, which is not shown, of the numerical controller 1 in accordance with a machine tool which is a control object.

Referring back to FIG. 1, the parameter setting value automatic selection unit 14 acquires, from the data table 21, a parameter setting value influenced by a size of a machining area, which corresponds to a size of a machining area estimated by the machining area estimation unit 12, and sets the acquired parameter setting value in the parameter setting storage unit 20 of the numerical controller 1.

Figure 3:
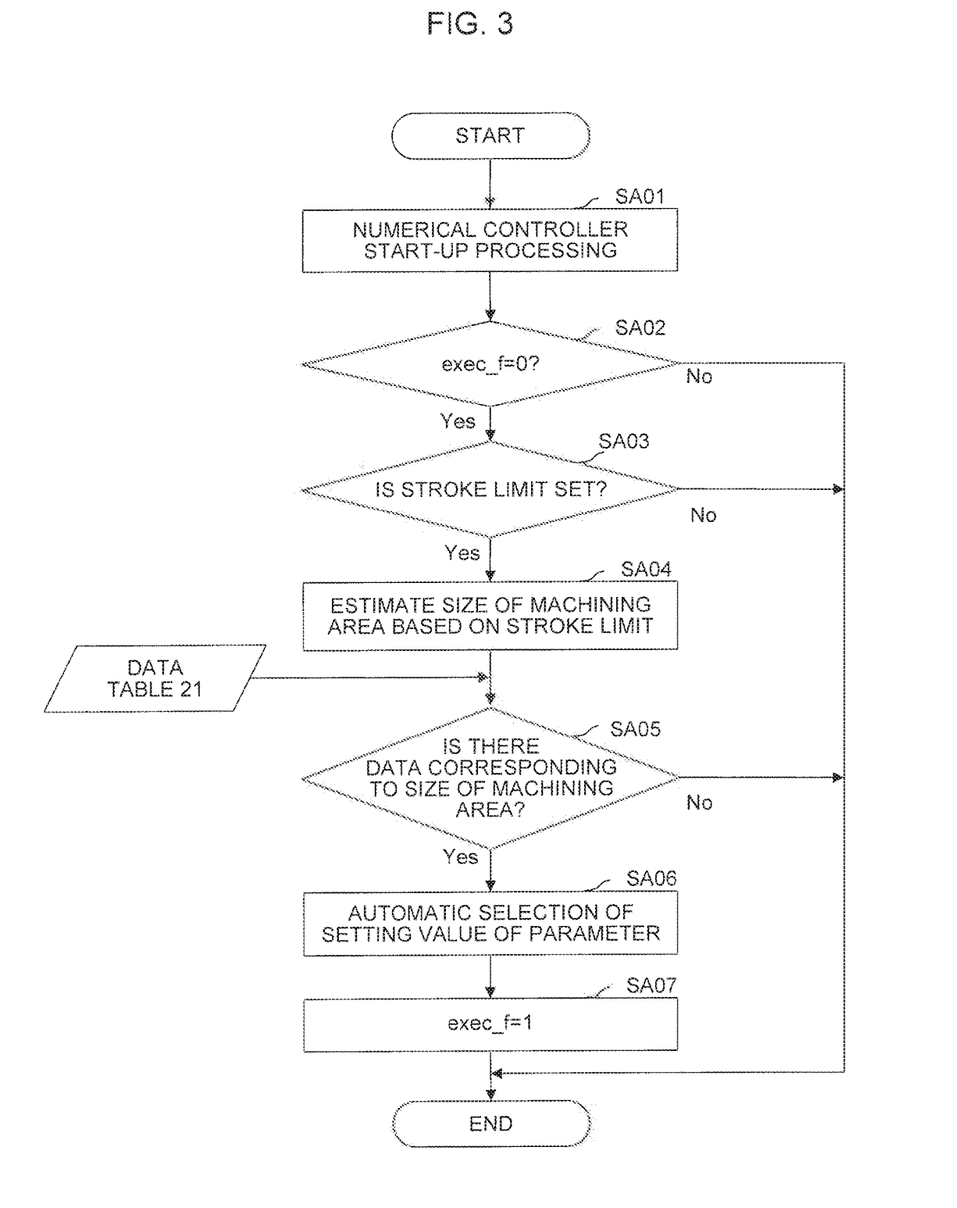
FIG. 3 is a flowchart illustrating a flow of processing executed on the numerical controller of FIG. 1.

FIG. 3 is a flowchart illustrating a flow of processing executed on the numerical controller 1 of FIG. 1.

In a region of a nonvolatile memory (not shown) of the numerical controller 1, an automatic selection completion flag exec_f which is a flag representing whether or not automatic selection is completed is prepared. It is assumed that this automatic selection completion flag exec_f has been cleared to be 0 in initial shipping of the numerical controller 1. Further, in the case where a machining area is changed with change of a machine tool which is a control object, for example, the automatic selection completion flag exec_f which has been set to be 1 can be reset to be 0 through a screen operation of the numerical controller 1 or an all clear operation of the nonvolatile memory performed by an operator.

[Step SA01] The numerical controller start-up unit 10 performs start-up processing such as check of a memory, various controllers, an interface, and the like, which are not shown, expansion of a system program on a memory, and execution of an initialization program.

[Step SA02] Whether or not a value of the automatic selection completion flag exec_f is 0 is determined. In the case where the value of the automatic selection completion flag exec_f is 0, it is determined that automatic selection of a parameter is not completed and the processing proceeds to step SA03, while, in the case where the value of the automatic selection completion flag exec_f is not 0, it is determined that the automatic selection of a parameter is already completed and the processing is ended.

[Step SA03] The stroke limit setting determination unit 11 refers to the parameter setting storage unit 20 so as to determine whether or not a setting value of a stroke limit of each axis is set. In the case where a setting value of a stroke limit of each axis is set, the processing proceeds to step SA04, while, in the case where a setting value of a stroke limit of each axis is not set, the processing is ended.

[Step SA04] The machining area estimation unit 12 estimates a size of a machining area based on a setting value of a stroke limit of each axis.

[Step SA05] The machining area determination unit 13 refers to the data table 21 based on the size of the machining area estimated in step SA04 so as to determine whether or not a setting value of a parameter corresponding to the estimated size of the machining area, which is influenced by a size of a machining area, is stored. In the case where a setting value of such parameter is stored, the processing proceeds to step SA06, while, in the case where a setting value of such parameter is not stored, the processing is ended.

[Step SA06] The parameter setting value automatic selection unit 14 acquires a parameter setting value corresponding to the size of the machining area estimated in step SA04, which is influenced by a size of a machining area, from the data table 21 so as to set the acquired parameter setting value in the parameter setting storage unit 20.

[Step SA07] In order to represent completion of automatic selection, the automatic selection completion flag exec_f is set to be 1.

According to the numerical controller configured as described above, a size of a machining area can be estimated based on a setting value of a parameter of each axis provided to a machine tool which is a control object and a parameter which is influenced by a size of a machining area can be determined based on the estimated size of the machining area, so that a parameter suitable for the machine tool can be automatically set even when the machine tool which is a control object is in an inoperable state.

A numerical controller according to a second embodiment of the present invention is now described with reference to FIGS. 4 to 6.

In the numerical controller according to the first embodiment described above, a size of a machining area is estimated based on a setting value of a parameter of each axis provided to a machine tool which is a control object and a parameter which is influenced by a size of a machining area is determined based on the estimated size of the machining area. In contrast, in the numerical controller according to the present embodiment, a size of a machining area is estimated based on a number of a motor (motor number) used for a spindle and a parameter corresponding to the estimated size of the machining area, which is influenced by a size of a machining area, is determined.

In general, as a size of a machining area is increased, a size of a workpiece is also increased and a load on a spindle is increased along with the increase of the size of a workpiece. In order to make the spindle endure the load, a spindle motor having a size corresponding to a size of a machining area is attached to a machine tool. Accordingly, a size of a machining area can be estimated based on a motor number of a spindle motor.

Figure 4:
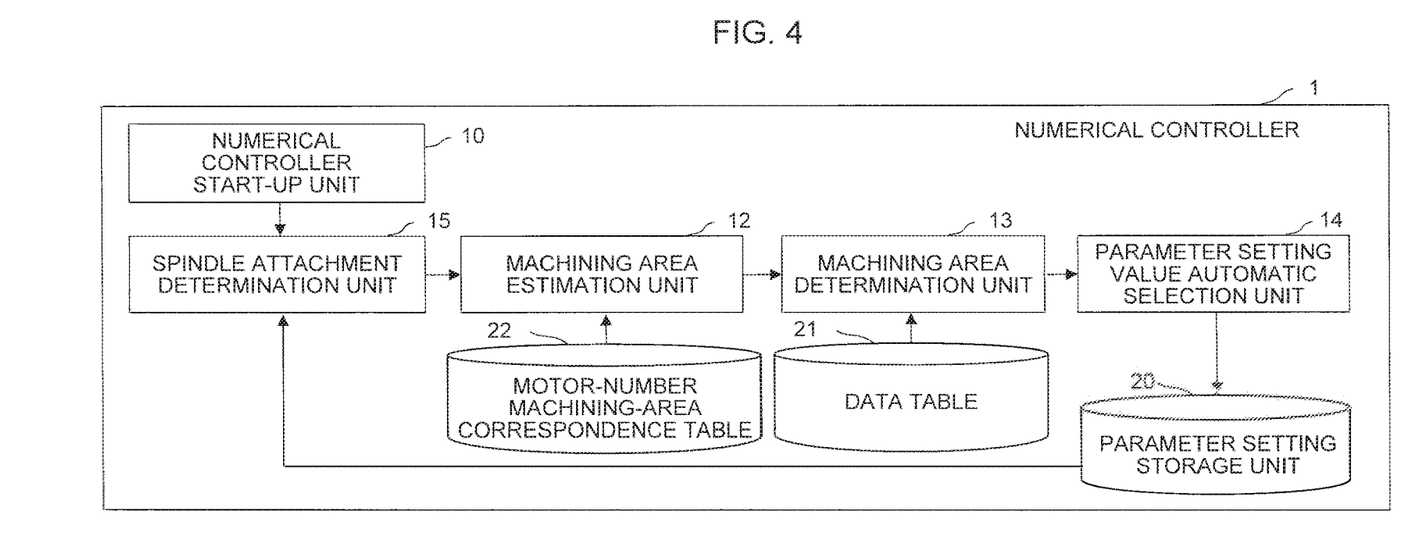
FIG. 4 is a functional block diagram illustrating a numerical controller according to a second embodiment of the present invention.
Figure 5:
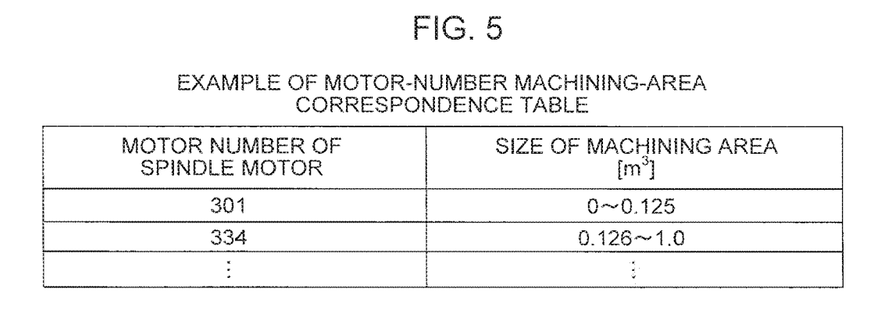
FIG. 5 illustrates a correspondence table included in the numerical controller of FIG. 4, in which a motor number and a machining area are associated with each other.

FIG. 4 is a functional block diagram illustrating the numerical controller according to the second embodiment of the present invention.

A numerical controller 1 according to the present embodiment corresponds to a numerical controller according to the first embodiment (FIG. 1) in which the stroke limit setting determination unit 11 is replaced with a spindle attachment determination unit 15.

This spindle attachment determination unit 15 confirms setting of a motor number of a motor used for a spindle provided to a machine tool which is a control object. The setting of a motor number of a motor is set in the parameter setting storage unit 20 provided on a memory (not shown) of the numerical controller 1. In the case where a motor number of a spindle motor is set, the spindle attachment determination unit 15 instructs the machining area estimation unit 12 to continue processing for automatically selecting a parameter setting value.

The machining area estimation unit 12 refers to a motor-number machining-area correspondence table 22 based on a motor number of a spindle motor which is set in the parameter setting storage unit 20 so as to estimate a size of a machining area corresponding to the motor number of the spindle motor. In this motor-number machining-area correspondence table 22, sizes of machining areas corresponding to motor numbers of spindle motors are stored, as illustrated in FIG. 5. Motor numbers and sizes of machining areas corresponding to respective motor numbers are stored in the motor-number machining-area correspondence table 22 by a maker of the numerical controller 1, but such configuration may be employed that an operator or the like can change motor numbers and sizes of machining areas with an input means (not shown) of the numerical controller 1 in accordance with a machine tool which is a control object.

Functions of other functional means are same as those of the first embodiment described above.

Figure 6:
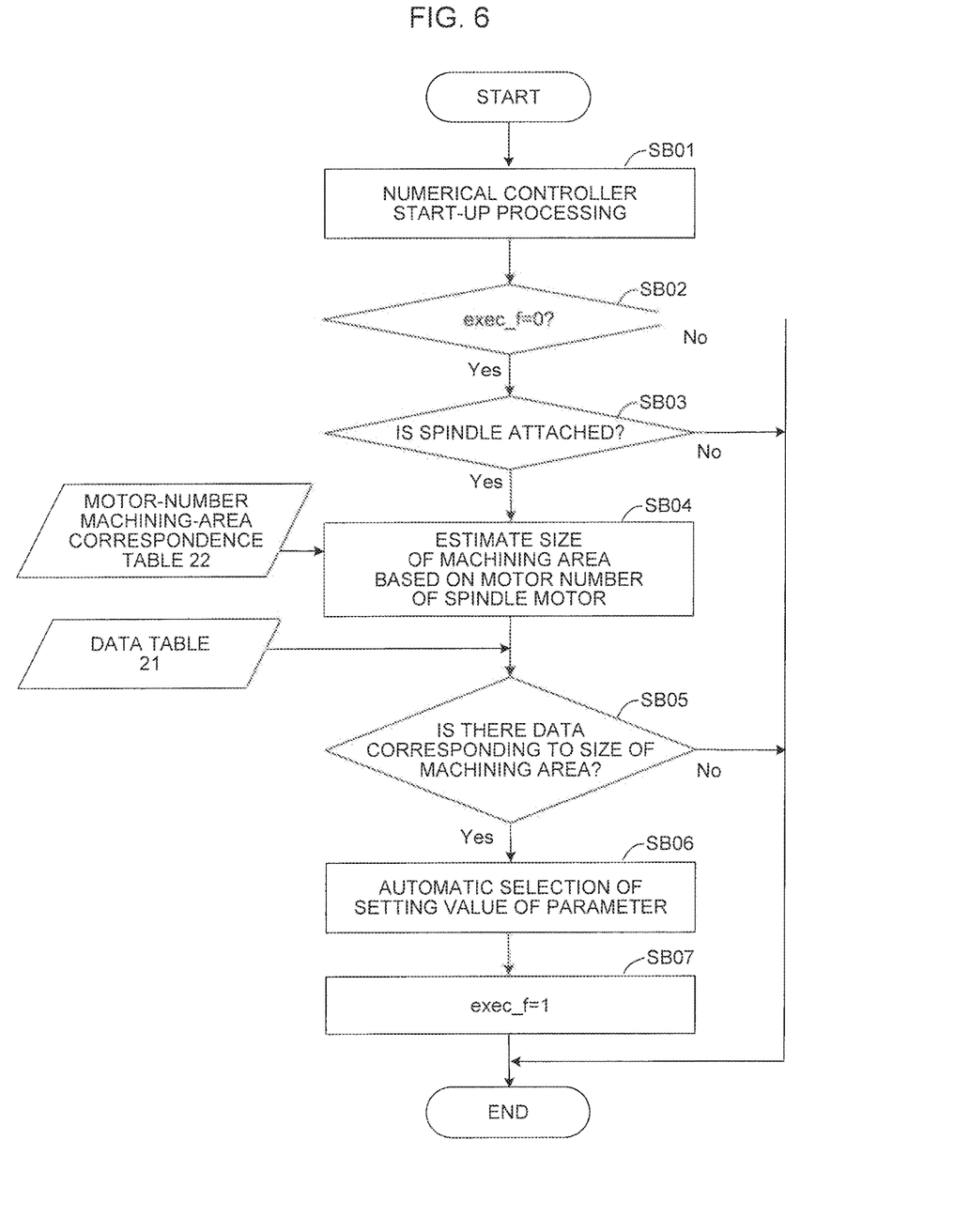
FIG. 6 is a flowchart illustrating a flow of processing executed on the numerical controller of FIG. 4.

FIG. 6 is a flowchart illustrating a flow of processing executed on the numerical controller 1 of FIG. 4.

In a region of a nonvolatile memory (not shown) of the numerical controller 1, an automatic selection completion flag exec_f, which is a flag representing whether or not automatic selection is completed, is prepared. It is assumed that this automatic selection completion flag exec_f is cleared to be 0 in initial shipping of the numerical controller 1. Further, in the case where a machining area is changed with change of a machine tool which is a control object, for example, the automatic selection completion flag exec_f, which is set to be 1, can be reset to be 0 through a screen operation of the numerical controller 1 and an all clear operation of the nonvolatile memory performed by an operator.

[Step SB01] The numerical controller start-up unit 10 performs start-up processing such as check of a memory, various controllers, an interface, and the like, which are not shown, expansion of a system program on a memory, and execution of an initialization program.

[Step SB02] Whether or not a value of the automatic selection completion flag exec_f is 0 is determined. In the case where the value of the automatic selection completion flag exec_f is 0, it is determined that automatic selection of a parameter is not completed and the processing proceeds to step SB03, while, in the case where the value of the automatic selection completion flag exec_f is not 0, it is determined that the automatic selection of a parameter is already completed and the processing is ended.

[Step SB03] The spindle attachment determination unit 15 refers to the parameter setting storage unit 20 so as to determine whether or not a setting value of a motor number of a spindle motor is set. In the case where a setting value of a motor number of a spindle motor is set, the processing proceeds to step SB04, while, in the case where a setting value of a motor number of a spindle motor is not set, the processing is ended.

[Step SB04] The machining area estimation unit 12 refers to the motor-number machining-area correspondence table 22 based on a motor number of a spindle motor which is set in the parameter setting storage unit 20 so as to estimate a size of a machining area corresponding to the motor number of the spindle motor.

[Step SB05] The machining area determination unit 13 refers to the data table 21 based on the size of the machining area estimated in step SB04 so as to determine whether or not a setting value of a parameter corresponding to the estimated size of the machining area, which is influenced by a size of a machining area, is stored. In the case where a setting value of such parameter is stored, the processing proceeds to step SB06, while, in the case where a setting value of such parameter is not stored, the processing is ended.

[Step SB06] The parameter setting value automatic selection unit 14 acquires a parameter setting value corresponding to the size of the machining area estimated in step SB04, which is influenced by a size of a machining area, from the data table 21 so as to set the acquired parameter setting value in the parameter setting storage unit 20 of the numerical controller 1.

[Step SB07] In order to represent completion of automatic selection, the automatic selection completion flag exec_f is set to be 1.

According to the numerical controller configured as described above, a size of a machining area can be estimated based on a motor number of a motor used for a spindle and a parameter which is influenced by a size of a machining area can be determined based on the estimated size of the machining area, so that a parameter suitable for a machine tool can be automatically set even when the machine tool which is a control object is in an inoperable state.

A numerical controller according to a third embodiment of the present invention is now described with reference to FIGS. 7 to 9.

In the numerical controller according to the second embodiment described above, a size of a machining area is estimated based on a motor number of a motor used for a spindle and a parameter which is influenced by a size of a machining area is determined based on the estimated size of the machining area. In contrast, in the numerical controller according to the present embodiment, a size of a machining area is estimated based on a motor number of a motor used for a feed axis and a parameter which is influenced by a size of a machining area is determined based on the estimated size of the machining area.

In general, as a size of a machining area is increased, a size of a workpiece is also increased and a load on a feed axis is increased along with the increase of the size of a workpiece. In order to make the feed axis endure the load, a feed axis motor having a size corresponding to a size of a machining area is attached to a machine tool. Accordingly, a size of a machining area can be estimated based on a motor number of a feed axis motor.

Figure 7:
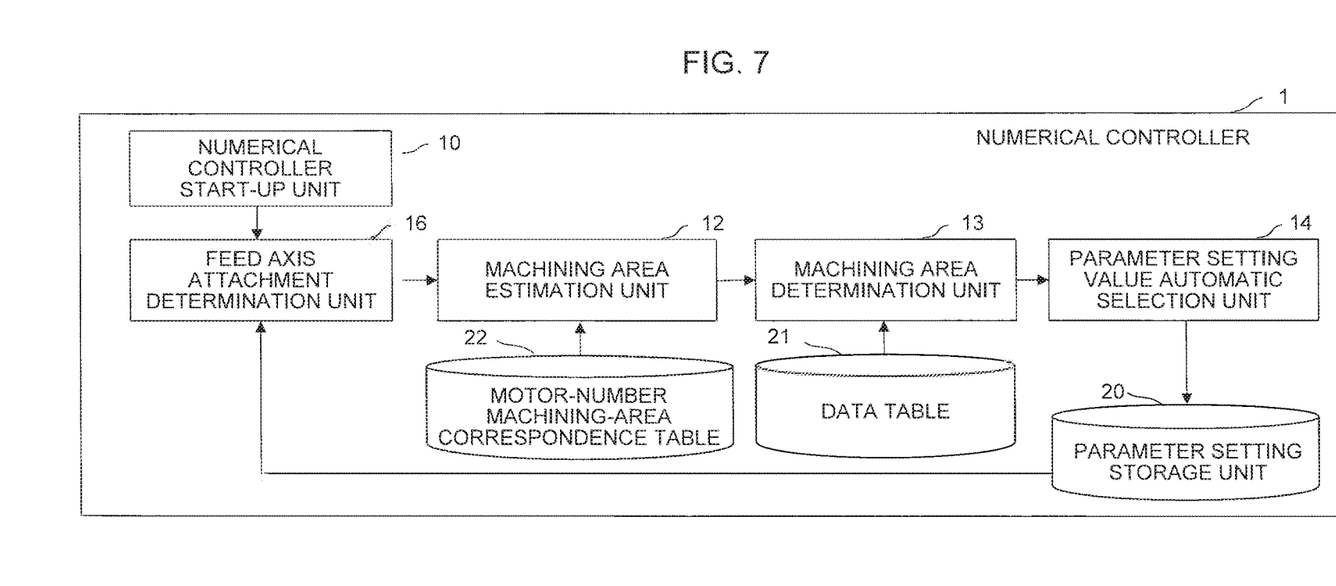
FIG. 7 is a functional block diagram illustrating a numerical controller according to a third embodiment of the present invention.
Figure 8:
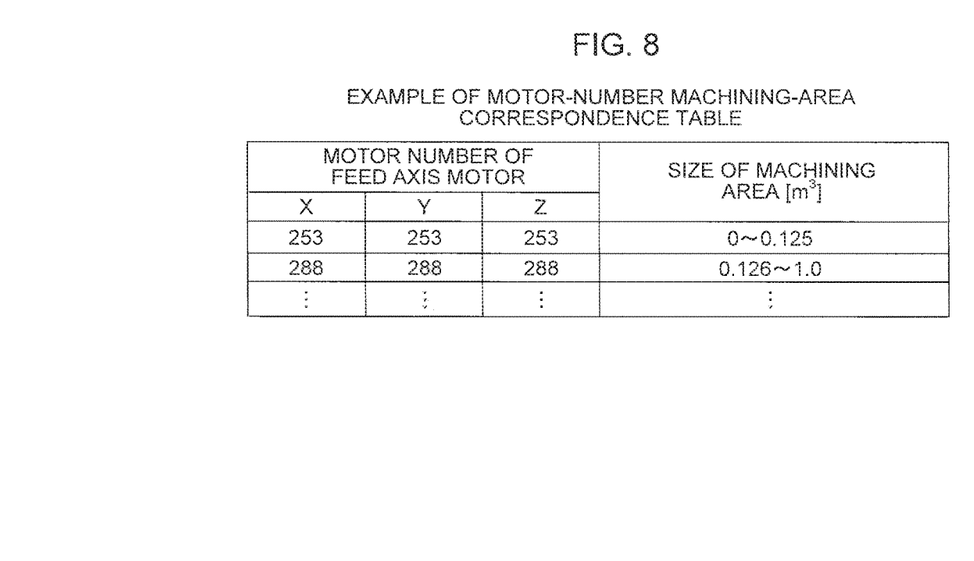
FIG. 8 illustrates a correspondence table included in the numerical controller of FIG. 7, in which a motor number and a machining area are associated with each other.

FIG. 7 is a functional block diagram illustrating the numerical controller according to the third embodiment of the present invention.

A numerical controller 1 according to the present embodiment corresponds to a numerical controller according to the second embodiment (FIG. 4) in which the spindle attachment determination unit 15 is replaced with a feed axis attachment determination unit 16.

This feed axis attachment determination unit 16 confirms setting of a motor number of a motor used for a feed axis provided to a machine tool which is a control object. The setting of a motor number of a motor is set in the parameter setting storage unit 20 provided on a memory (not shown) of the numerical controller 1. In the case where a motor number of a feed axis motor is set, the feed axis attachment determination unit 16 instructs the machining area estimation unit 12 to continue processing for automatically selecting a parameter setting value.

The machining area estimation unit 12 refers to the motor-number machining-area correspondence table 22 based on a motor number of a feed axis motor which is set in the parameter setting storage unit 20 so as to estimate a size of a machining area corresponding to the motor number of the feed axis motor. In this motor-number machining-area correspondence table 22, sizes of machining areas corresponding to combinations of motor numbers of feed axis motors are stored, as illustrated in FIG. 8. Combinations of motor numbers and sizes of machining areas corresponding to respective combinations of motor numbers are stored in the motor-number machining-area correspondence table 22 by a maker of the numerical controller 1, but such configuration may be employed that an operator or the like can change combinations of motor numbers and sizes of machining areas with an input means (not shown) of the numerical controller 1 in accordance with a machine tool which is a control object.

Functions of other functional means are same as those of the second embodiment described above.

Figure 9:
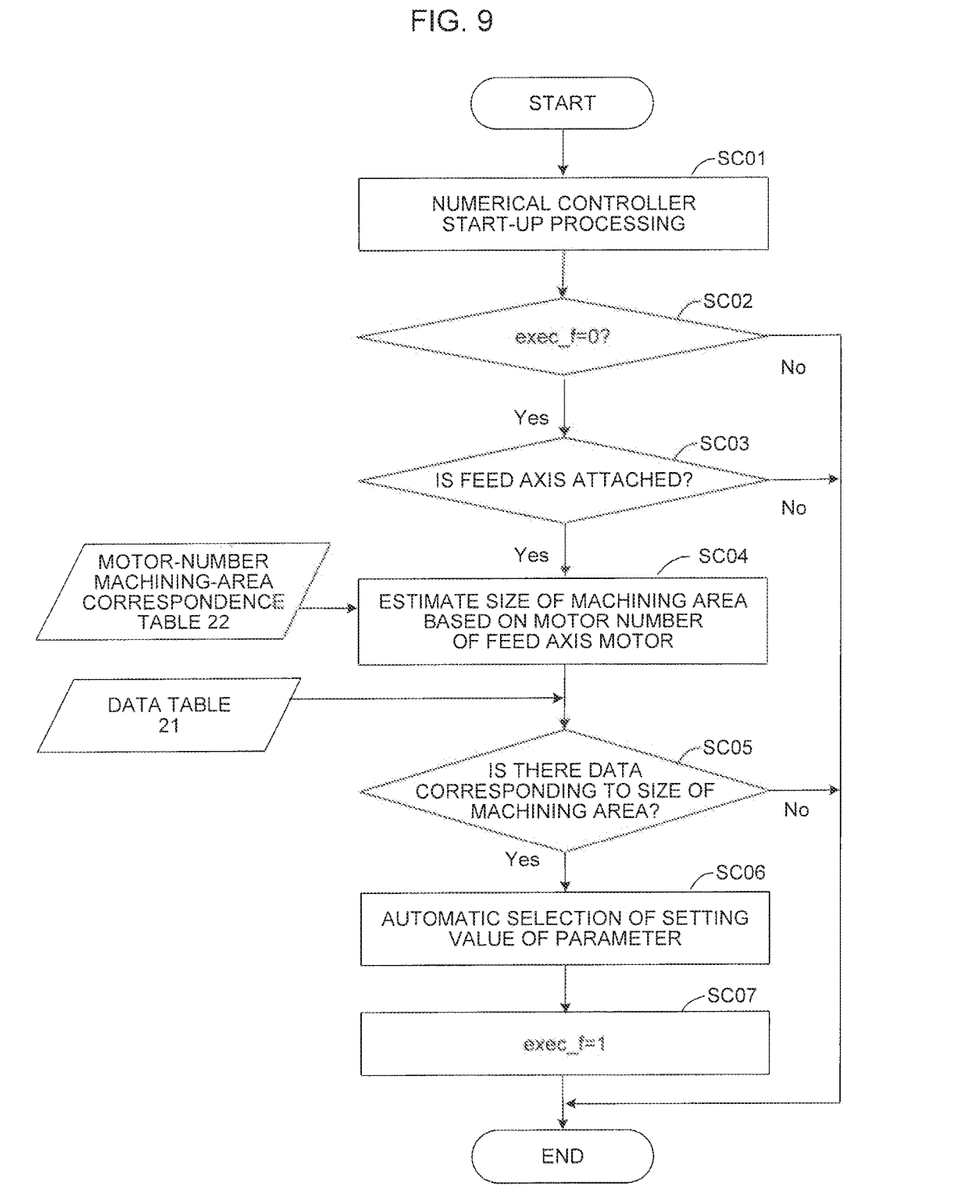
FIG. 9 is a flowchart illustrating a flow of processing executed on the numerical controller of FIG. 7

FIG. 9 is a flowchart illustrating a flow of processing executed on the numerical controller 1 of FIG. 7.

In a region of a nonvolatile memory (not shown) of the numerical controller 1, an automatic selection completion flag exec_f, which is a flag representing whether or not automatic selection is completed, is prepared. It is assumed that this automatic selection completion flag exec_f is cleared to be 0 in initial shipping of the numerical controller 1. Further, in the case where a machining area is changed with change of a machine tool which is a control object, for example, the automatic selection completion flag exec_f, which is set to be 1, can be reset to be 0 through a screen operation of the numerical controller 1 and an all clear operation of the nonvolatile memory performed by an operator.

[Step SC01] The numerical controller start-up unit 10 performs start-up processing such as check of a memory, various controllers, an interface, and the like, which are not shown, expansion of a system program on a memory, and execution of an initialization program.

[Step SC02] Whether or not a value of the automatic selection completion flag exec_f is 0 is determined. In the case where the value of the automatic selection completion flag exec_f is 0, it is determined that automatic selection of a parameter is not completed and the processing proceeds to step SC03, while, in the case where the value of the automatic selection completion flag exec_f is not 0, it is determined that the automatic selection of a parameter is already completed and the processing is ended.

[Step SC03] The feed axis attachment determination unit 16 refers to the parameter setting storage unit 20 so as to determine whether or not a setting value of a motor number of a feed axis motor is set. In the case where a setting value of a motor number of a feed axis motor is set, the processing proceeds to step SC04, while, in the case where a setting value of a motor number of a feed axis motor is not set, the processing is ended.

[Step SC04] The machining area estimation unit 12 refers to the motor-number machining-area correspondence table 22 based on a motor number of a feed axis motor which is set in the parameter setting storage unit 20 so as to estimate a size of a machining area corresponding to the motor number of the feed axis motor.

[Step SC05] The machining area determination unit 13 refers to the data table 21 based on the size of the machining area estimated in step SC04 so as to determine whether or not a setting value of a parameter corresponding to the estimated size of the machining area, which is influenced by a size of a machining area, is stored. In the case where a setting value of such parameter is stored, the processing proceeds to step SC06, while, in the case where a setting value of such parameter is not stored, the processing is ended.

[Step SC06] The parameter setting value automatic selection unit 14 acquires a parameter setting value corresponding to the size of the machining area estimated in step SC04, which is influenced by a size of a machining area, from the data table 21 so as to set the acquired parameter setting value in the parameter setting storage unit 20 of the numerical controller 1.

[Step SC07] In order to represent completion of automatic selection, the automatic selection completion flag exec_f is set to be 1.

According to the numerical controller configured as described above, a size of a machining area can be estimated based on a motor number of a motor used for a feed axis and a parameter which is influenced by a size of a machining area can be determined based on the estimated size of the machining area, so that a parameter suitable for a machine tool can be automatically set even when the machine tool which is a control object is in an inoperable state.

The embodiments of the present invention have been described above. However, it should be noted that the present invention is not limited to the examples of the above-described embodiments and can be embodied in various aspects by adding appropriate alterations.

For example, the methods for estimating a size of a machining area by respectively using a setting value of a stroke limit of a axis, a setting value of a motor number of a spindle motor, and a setting value of a motor number of a feed axis motor have been respectively described in the above-mentioned embodiments. However, a size of a machining area may be estimated by using a setting value of another parameter or by combining various parameters. In the case where a size of a machining area is estimated by combining a plurality of parameters, a table in which a plurality of combinations of parameters and sizes of machining areas to be estimated are respectively associated with each other may be prepared or a calculating formula for estimating a size of a machining area based on various parameters may be used.

The invention claimed is:

1. A numerical controller which controls a machine performing machining of a workpiece in a machining area, the numerical controller comprising:
  a parameter setting storage unit in which a setting value of a parameter used for control of the machine is set; and
  a processor configured as:
    a machining area estimation unit that estimates a three dimensional size of the machining area based on the setting value of the parameter that is set in the parameter setting storage unit, the machining area is a three dimensional area in which movement of the machine is limited based on stroke limits of the machine;
    a data table including a registered plurality of three dimensional sizes of the machining area and a registered plurality of setting values of the parameter influenced by the three dimensional size of the machining area, each of the three dimensional sizes corresponding to a respective one of the setting values, and each of the setting values includes a motor number identifying a respective motor corresponding to a size of a spindle motor;
    a machining area determination unit that determines whether data corresponding to the three dimensional size of the machining area, which is estimated by the machining area estimation unit, is registered on the data table;
    a parameter setting value automatic selection unit that acquires a setting value of the parameter corresponding to the three dimensional size of the machining area from the data table so as to set the acquired setting value of the parameter in the parameter setting storage unit in a case where the machining area determination unit determines that data corresponding to the three dimensional size of the machining area is registered on the data table; and
    a spindle attachment determination unit that determines whether or not a setting value of a motor number identifying the motor is set in the parameter setting storage unit; wherein
    in the case where the spindle attachment determination unit determines that a setting value of the motor number of the spindle motor is set in the parameter setting storage unit, the machining area estimation unit estimates the three dimensional size as one of the three dimensional sizes of the machining area registered in the data table that corresponds to the motor number of the spindle motor registered in the data table, and
  wherein the processor is further configured to control the machine to perform machining of the workpiece in a machining area based on the setting value of the parameter corresponding to the three dimensional size of the machining area.

2. The numerical controller according to claim 1, further comprising:
  a spindle motor-number machining-area correspondence table in which the motor number of the spindle motor and a size of the machining area are associated with each other; wherein
  the machining area estimation unit estimates a size of the machining area by referring to the spindle motor-number machining-area correspondence table based on a setting value of the motor number of the spindle motor.

3. The numerical controller according to claim 1, further comprising:
a stroke limit setting determination unit that determines whether or not a setting value of a stroke limit of at least one axis included in the machine is set in the parameter setting storage unit; wherein
in the case where the stroke limit setting determination unit determines that a setting value of a stroke limit of the axis is set in the parameter setting storage unit, the machining area estimation unit estimates a size of the machining area based on the setting value of the stroke limit of the axis.

4. The numerical controller according to claim 2, further comprising:
a stroke limit setting determination unit that determines whether or not a setting value of a stroke limit of at least one axis included in the machine is set in the parameter setting storage unit; wherein
in the case where the stroke limit setting determination unit determines that a setting value of a stroke limit of the axis is set in the parameter setting storage unit, the machining area estimation unit estimates a size of the machining area based on the setting value of the stroke limit of the axis.

5. A numerical controller which controls a machine performing machining of a workpiece in a machining area, the numerical controller comprising:
a parameter setting storage unit in which a setting value of a parameter used for control of the machine is set; and
a processor configured as:
a machining area estimation unit that estimates a three dimensional size of the machining area based on the setting value of the parameter that is set in the parameter setting storage unit, the machining area is a three dimensional area in which movement of the machine is limited based on stroke limits of the machine;
a data table including a registered plurality of three dimensional sizes of the machining area and a registered plurality of setting values of the parameter influenced by the three dimensional size of the machining area, each of the three dimensional sizes corresponding to a respective one of the setting values, and each of the setting values includes a motor number identifying a respective motor corresponding to a size of a feed axis motor;
a machining area determination unit that determines whether data corresponding to the three dimensional size of the machining area, which is estimated by the machining area estimation unit, is registered on the data table;
a parameter setting value automatic selection unit that acquires a setting value of the parameter corresponding to the three dimensional size of the machining area from the data table so as to set the acquired setting value of the parameter in the parameter setting storage unit in a case where the machining area determination unit determines that data corresponding to the three dimensional size of the machining area is registered on the data table; and
a feed axis attachment determination unit that determines whether or not a setting value of a motor number identifying the motor is set in the parameter setting storage unit;
wherein in the case where the feed axis attachment determination unit determines that a setting value of the motor number of the feed axis motor is set in the parameter setting storage unit, the machining area estimation unit estimates the three dimensional size as one of the three dimensional sizes of the machining area registered in the data table that corresponds to the motor number of the feed axis motor registered in the data table, and
wherein the processor is further configured to control the machine to perform machining of the workpiece in a machining area based on the setting value of the parameter corresponding to the three dimensional size of the machining area.

6. The numerical controller according to claim 5, further comprising:
a feed axis motor-number machining-area correspondence table in which the motor number of the at least one feed axis motor and a size of the machining area are associated with each other; wherein
the machining area estimation unit estimates a size of the machining area by referring to the feed axis motor-number machining-area correspondence table based on a setting value of the motor number of the feed axis motor.

7. The numerical controller according to claim 5, further comprising:
a stroke limit setting determination unit that determines whether or not a setting value of a stroke limit of at least one axis included in the machine is set in the parameter setting storage unit; wherein
in the case where the stroke limit setting determination unit determines that a setting value of a stroke limit of the axis is set in the parameter setting storage unit, the machining area estimation unit estimates a size of the machining area based on the setting value of the stroke limit of the axis.

8. The numerical controller according to claim 6, further comprising:
a stroke limit setting determination unit that determines whether or not a setting value of a stroke limit of at least one axis included in the machine is set in the parameter setting storage unit; wherein
in the case where the stroke limit setting determination unit determines that a setting value of a stroke limit of the axis is set in the parameter setting storage unit, the machining area estimation unit estimates a size of the machining area based on the setting value of the stroke limit of the axis.

* * * * *